United States Patent [19]
Heine et al.

[11] Patent Number: 6,166,162
[45] Date of Patent: Dec. 26, 2000

[54] REFRACTORY MATERIAL

[75] Inventors: Norbert Heine, Frankenthal; Thomas Ballewski, Moers; Manfred Grossman, Düsseldorff, all of Germany

[73] Assignees: Thyssen Krupp Stahl GmbH, Duisburg, Germany; Perstorp AB, Perstorp, Sweden

[21] Appl. No.: 09/171,592

[22] PCT Filed: Apr. 19, 1997

[86] PCT No.: PCT/EP97/01983
§ 371 Date: Dec. 22, 1998
§ 102(e) Date: Dec. 22, 1998

[87] PCT Pub. No.: WO97/40195
PCT Pub. Date: Oct. 30, 1997

[30] Foreign Application Priority Data

Apr. 19, 1996 [DE] Germany ............... 296 07 867 U

[51] Int. Cl.$^7$ ....................................... C08G 2/00
[52] U.S. Cl. ........................................ 528/3; 528/2
[58] Field of Search ................................... 528/3

[56] References Cited

PUBLICATIONS

Indian Foundry Journal, Bd. 21, Nr. 6, (1975) D.N. Bhatia et al.

*Primary Examiner*—Terressa M. Boykin
*Attorney, Agent, or Firm*—Orum & Roth

[57] ABSTRACT

An ecologically sound refractory material includes a binder made of a cashew nutshell liquid and a resin selected from a liquid phenol resin, a phenol homologue and a formaldehyde homologue.

15 Claims, No Drawings

REFRACTORY MATERIAL

The invention concerns a refractory material which essentially consists of a binder or a binder mixture, a filler or a filler mixture as well as a hardener.

Such a refractory material is known and is used, for example, as taphole material for blast furnaces. Here, those refractory materials which meet the ISO Standard 1109 or the ISO Standard 2246 are to be understood by the term "refractory material". The disadvantage of the known refractory materials is that tar or tar-containing materials are used as binder or admixture. Such a binder for the fillers adapted to the particular application of the refractory material has admittedly the advantageous property that the refractory material made with this is plastic and that the high content of carbon of the tar-containing binder brings about a good bonding of the fillers. However, the serious disadvantage of such binders is that the latter are carcinogenic and thus entail employee health-care problems as well as problems with the disposal.

The disadvantage of the known refractory materials is that tar or tar-containing materials are used as binder or admixture. Such a binder for the fillers adapted to the particular application of the refractory material has admittedly the advantageous property that the refractory material made with this is plastic and that the high content of carbon of the tar-containing binder brings about a good bonding of the fillers. However, the serious disadvantage of such binders is that the latter are carcinogenic and thus entail employee health-care problems as well as problems with the disposal.

In DE 37 02 935, for the reduction of the tar content of a refractory material intended for use as taphole material, a binder and plastifier is therefore proposed which consists of one or several interface-active products of the combination of alkyl oxides with substances from the group of fatty alcohols, fatty acids, fatty acid polyolesters, resin acids, resin alcohols and/or natural resins and their products such as shellac, balsams, oils of turpentine or rosin. In this case, it is preferred that the interface-active compound from the group of the alkyl oxide substituted products with fatty alcohol, fatty acid polyolester is in the range of 0.1 to 5 parts by weight and the parts of alkyl oxide combination products with natural resin and its products is approximately 0.1 to 25 parts by weight.

By means of this binder, according to the particulars of the above-mentioned publication, the tar content in taphole materials which usually is in the order of magnitude of 15% and more is in this way to be reduced to less than 5%. A carbon-containing, ceramic refractory material, which uses the binder and plastifier described in the above-mentioned publication, has therefore still a tar content which is not to be disregarded so that also this refractory material has the serious disadvantage that the therein contained tar contains numerous aromatic, heterocyclic and condensed organic cyclic compounds which are known to be toxic and carcinogenic. These compounds are released during the processing and use, and lead, as the corresponding statutory regulations also show, to risks to the health of the employees and the environments.

Another disadvantage of the known binder and plastifier for a refractory, carbon-containing, anhydrous, ceramic material consists in that the known refractory material only has a low cold compression strength. Low cold compression strengths are in an unfavourable way usually not adequate for modern blast furnaces.

In DE 37 21 642, a binder and plastifier for carbon-containing, ceramic refractory materials is likewise described which is supposed to bring about a reduction of the noxious components and emissions which result from tar and the conventional tar substitutes. The binder and plastifier, suitable only for a refractory material using carbon black and/or graphite in the smallest distribution form with particle sizes of less than 150 $\mu$m, contains in addition to the carbon black and/or graphite, interface-active products of the combination of alkyl oxides with substances from the group of fatty alcohols, fatty acids, fatty acid polyolesters and/or alicyclic hydrocarbon products of the turpentine and natural resin type. The disadvantage of the known binder is again that it only has a low cold compression strength and is moreover not completely tar-free.

From DE 44 37 584, a filler material for tapholes of a blast furnace is known. The filler material contains 5–15 parts by weight anthracene oil and 1–7 parts by weight boric acid which are added as binder and is kneaded together with 100 parts by weight of a composition of a refractory material in which case the composition of the refractory material consists of a compound or a combination of two or several compounds selected from the group which comprises aluminium oxide, bauxite, spinel, pagodite, chamotte, silicon carbide, graphite, clay and the like. The filler known from the above-mentioned publication is, according to the particulars contained in the publication, supposed to suppress environmental pollution factors in the filler material and in particular to reduce the quantity of benzpyrene considered as carcinogenic. However, such a filler material is critical from the point of view of employee health-care since benzpyrene also is contained in a quantity of 80 ppm in the anthracene oil so that such a filler only in exceptional cases satisfies the regulations of the maximum workplace concentration.

From DE-OS 36 37 720, a refractory material is known which can contain mineral fillers, carbon and coke, organic solvents, thermosetting resin and plastifier in which case a mixture of a novolak or a novolak solution and one or several heat-reactive natural oils, for example, cashew nutshell oils, alone or in a mixture with other heat-reactive oils. The disadvantage of this known refractory material is that it still contains tar, tar products or organic solvents.

From the publication Indian Foundry Journal, vol, 21, June 1975, pp. 10–15. It is known to use cashew nutshell liquid mixed with sand or catalyst for the manufacture of core sand.

The object of the invention is therefore to develop further a refractory material of the type mentioned at the beginning in such a way that in ecological respects it is without problems and in particular free of tar or tar products.

According to the invention, this problem is solved by using as binder either cashew nutshell liquid, a cashew nutshell liquid-containing substance or a cashew nutshell liquid-containing substance mixture alone or in combination with a liquid phenol resin of the resol type or a resin of the resol type based on phenol homologues or formaldehyde homologues.

Thus, according to the invention, it is provided that cashew nutshell liquid (CNSL) or a cashew nutshell liquid-containing substance or such a substance mixture either alone or in combination with liquid phenol resins of the resol type or resins base don phenol homologues is used as binder. This measure according to the invention has the advantage that by this means it is possible in a particularly simple way to achieve the strengths required in practice and, through variations of the binder composition, to adapt to specific plant requirements.

Besides simple manufacturing, the refractory material according to the invention does not only distinguish itself in that the refractory material according to the invention is without problems with respect to ecology due to the substitution according to the invention of tar-containing binders by CNSL or CNSL-containing binders. Another advantage of the refractory material according to the invention consists in that a renewable raw material is used as binder or binder component.

An advantageous further development of the invention provides that prepolymerized CNSL or a substance mixture containing prepolymerized CNSL in combination with a hardener providing formaldehyde is used as binder for the fillers of the refractory material according to the invention. This measure according to the invention has the advantage that the refractory material produced in this way hardens more rapidly. When using this refractory material as blast furnace taphole material or as ramming material, the particularly short hardening time makes possible, for example, a better availability of the tapping systems of a blast furnace. When using this refractory material for the manufacture of preformed parts in which the binder carbonizes through heat treatment, higher production rates can be realized.

Another advantageous further development of the invention provides that a copolymer of CNSL or a CNSL-containing substance and phenol and/or phenol homologues is used as binder. Such a measure has the advantage that the binder according to the invention for the refractory material according to the invention does not have to be mixed mechanically anymore.

Another advantageous further development of the invention provides that a chemically and/or physically inert and/or condensable admixture is added to the binder according to the invention.

Other advantageous further developments of the invention are the subject of dependent claims.

Other particulars and advantages of the invention are to be inferred from the exemplified embodiments described in the following.

The refractory material consists in a way known in itself essentially of one or several fillers, including carbon carriers, or a mixture of such fillers and a binder or binder mixture, bonding these fillers to a plastic material. Mineral fillers such as kaolin, dolomite, or corundum can, for example, be used as fillers. The artisan knows how he has to select the fillers with regard to their properties relevant to the intended application of the refractory material so that further details about the physical and/or chemical properties of these in themselves known fillers are here not necessary.

It is important to note that in the described refractory material, tar materials or tar derivatives, carcinogenic and therefore problematic with regard to employee health-care and for the disposal, are not used anymore as binder for the fillers as in the known refractory material, but that CNSL or a CNSL-containing substance is used as binder in which case "cashew nutshell liquid" is meant by the designation CNSL, thus an ecologically harmless and renewable raw material.

The refractory material is made of the above-mentioned fillers, the binder and the hardener by mixing these components mechanically until a sufficiently high homogenous distribution of the fillers in the binder is achieved. This elastic material is then put in appropriate form, for example, in the form of a brick and is used or traded in such a way. It is used, for example, as blast furnace taphole material to (re)seal a blast furnace after the tapping of steel melted in the blast furnace or as channel material to build the channels transporting the liquid steel or as ramming material to patch damaged spots as well as to manufacture preformed components in which case the binder is carbonized through heat treatment.

As CNSL-containing binder for the fillers of the refractory material, the subsequent variants described in the following are now considered in particular:

Firstly, it is possible to use CNSL which was mixed, if necessary, with chemically and/or physically inert and/or condensable admixtures as starting material for the binder-resin. This component of the binder-resin prepared in such a way is then mixed with a hardener providing formaldehyde under the effect of heat in order to cross-link the polymer compounds of the CNSL. The binder-resin produced in such a way is then—as already described above—mixed mechanically with the fillers into plastic refractory material.

Another possibility consists in that a prepolymerized CNSL or a prepolymerizing CNSL mixture is used as binder for the fillers. Such an arrangement has the advantage that in this way particularly rapid hardening times are realized.

Another possibility consists in that a CNSL-containing substance or such a substance mixture in combination with liquid phenol resins of the resol type which, as everyone knows, have a phenol to formaldehyde molar ratio of 1:greater than 1 or analogous resins based on phenol or formaldehyde is used as binder for the fillers of the described refractory material, in which case it is preferred that in this case the amount of the free (that is monomeric) phenol present after the condensation or mechanical processing is less than 5%.

As other variants it is possible to use a copolymer of a CNSL-containing substance or of CNSL and phenol and/or phenolhomologues as binder for the fillers.

What is claimed is:

1. A refractory material comprising:
   at least one of a binder and binder mixture,
   said binder comprising at least one of a cashew nutshell liquid containing substance and a resin,
   said resin selected from the group consisting of a liquid phenol resin of a resol type, a resin based on phenol homologues, and a resin based on formaldehyde homologues.

2. A refractory material according to claim 1 wherein said cashew nutshell liquid containing substance acts to bond said filters of the refractory material, and said cashew nutshell liquid further comprises prepolymerized cashew nutshell liquid.

3. A refractory material according to claim 1 wherein said binder comprises copolymers of said cashew nutshell liquid containing substance and at least one of said phenol, phenol homologues, and formaldehyde homologues.

4. A refractory material according to claim 1 wherein said liquid phenol resin of the resol type has a phenol to formaldehyde molar ratio of 1:greater than 1.

5. A refractory material according to claim 1 wherein said resin based on phenol and formaldehyde homologues is a resin analogous to said phenol resin.

6. A refractory material according to claim 1 wherein said binder includes no more than 5% monomeric phenol.

7. A refractory material according to claim 1 wherein said hardener reacts to form formaldehyde.

8. A refractory material according to claim 1 wherein said binder further comprises an admixture of an inert material.

9. A refractory material according to claim 1 wherein said binder further comprises an admixture of a condensable material.

10. A blast furnace taphole material comprising the refractory material according to claim 1.

11. A channel material comprising the refractory material according to claim 1.

12. A ramming material, comprising the refractory material of claim 1.

13. A formed part comprising the refractory material according to claim 1.

14. A refractory material according to claim 1, wherein said cashew nutshell liquid containing substance is a pure cashew nutshell liquid.

15. A refractory material according to claim 1, wherein said cashew nutshell liquid containing substance is a cashew nutshell liquid containing substance mixture.

* * * * *